US009445218B2

(12) United States Patent
Lee et al.

(10) Patent No.: US 9,445,218 B2
(45) Date of Patent: Sep. 13, 2016

(54) EFFICIENT MACHINE TO MACHINE COMMUNICATIONS

(71) Applicant: Verizon Patent and Licensing Inc., Arlington, VA (US)

(72) Inventors: Jay J. Lee, San Ramon, CA (US); Gerard J Flynn, Washington, NJ (US); Jingyi Zhou, Belle Mead, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 566 days.

(21) Appl. No.: 13/886,738

(22) Filed: May 3, 2013

(65) Prior Publication Data

US 2014/0330925 A1  Nov. 6, 2014

(51) Int. Cl.
| | |
|---|---|
| H04W 4/00 | (2009.01) |
| H04W 4/08 | (2009.01) |
| H04W 4/18 | (2009.01) |
| H04W 52/02 | (2009.01) |

(52) U.S. Cl.
CPC .............. *H04W 4/006* (2013.01); *H04W 4/08* (2013.01); *H04W 4/18* (2013.01); *H04W 4/005* (2013.01); *H04W 52/0203* (2013.01); *Y02B 60/50* (2013.01)

(58) Field of Classification Search
CPC .............. H04L 67/02; H04L 61/3075; H04L 12/2602; H04L 45/46; H04W 4/005; H04W 24/10; H04W 40/02; H04W 28/0221; H04W 48/10; H04W 52/0251; H04W 88/02; H04W 40/24; H04W 40/248; H04W 4/08; Y02B 60/50; G06F 11/3466
See application file for complete search history.

(56) References Cited

U.S. PATENT DOCUMENTS

| | | | | |
|---|---|---|---|---|
| 6,385,174 B1 * | 5/2002 | Li | ........................ | H04L 45/028 370/252 |
| 6,988,133 B1 * | 1/2006 | Zavalkovsky | ........ | H04L 67/322 709/220 |
| 7,254,645 B2 * | 8/2007 | Nishi | ...................... | H04L 12/46 709/223 |
| 7,299,265 B2 * | 11/2007 | Chatterjee | ........... | H04L 41/5054 709/203 |
| 7,784,060 B2 * | 8/2010 | Baumberger | ........... | G06F 9/546 718/1 |
| 8,243,743 B2 * | 8/2012 | Martin | ................ | H04L 12/4625 370/360 |
| 8,923,186 B1 * | 12/2014 | daCosta | .................. | H04W 4/00 370/312 |
| 9,210,567 B2 * | 12/2015 | Park | ...................... | H04W 28/18 |
| 2004/0034703 A1 * | 2/2004 | Phadke | ............... | H04L 12/2602 709/224 |
| 2007/0127391 A1 * | 6/2007 | Goodman | ........... | H04L 41/5003 370/252 |
| 2009/0225763 A1 * | 9/2009 | Forsberg | ............. | H04L 12/5695 370/401 |

(Continued)

*Primary Examiner* — Sargon Nano (57) ABSTRACT

Techniques described herein may provide for the organization and the control of nodes in an Machine to Machine (M2M) domain that is energy efficient and may provide for prioritized control of network traffic. Data may be received from of clusters of nodes in a M2M network, each of the clusters including one or more nodes to generate the data and a hub node to receive, from the one or more nodes, the generated data. The hub node may transmit the generated data. An update interval for the one or more nodes in each of the clusters may be set on a per-cluster basis and the update interval may define a period at which the one or more nodes in a particular cluster transmit data towards a corresponding hub node of the particular cluster. Additionally, an update interval for the hub node may be set, the update interval for the hub node being set on a per-cluster basis and defining a period at which the hub node transmits data.

20 Claims, 9 Drawing Sheets

(56) References Cited

U.S. PATENT DOCUMENTS

| | | | | |
|---|---|---|---|---|
| 2010/0177766 A1* | 7/2010 | daCosta | H04L 65/1069 370/352 |
| 2012/0072578 A1* | 3/2012 | Alam | H04L 41/5009 709/224 |
| 2012/0178464 A1* | 7/2012 | Li | H04W 72/02 455/450 |
| 2012/0271926 A1* | 10/2012 | Shakirzyanov | G06F 9/5072 709/220 |
| 2013/0198838 A1* | 8/2013 | Schmidt | H04L 9/3234 726/22 |
| 2013/0252643 A1* | 9/2013 | Park | H04W 8/24 455/458 |
| 2013/0265984 A1* | 10/2013 | Li | H04B 7/2656 370/330 |
| 2013/0310016 A1* | 11/2013 | Park | H04W 28/18 455/418 |
| 2014/0086122 A1* | 3/2014 | Gupta | H04B 7/0632 370/311 |
| 2014/0269779 A1* | 9/2014 | Shan | H04W 28/24 370/509 |
| 2014/0341109 A1* | 11/2014 | Cartmell | H04L 45/308 370/328 |
| 2015/0181564 A1* | 6/2015 | Rao | H04W 24/04 370/329 |
| 2015/0249486 A1* | 9/2015 | Stratigos, Jr. | H04L 27/06 370/328 |

* cited by examiner

EFFICIENT MACHINE TO MACHINE COMMUNICATIONS

Machine to Machine (M2M) communications refer to technologies that allow devices, which may be referred to as nodes in the M2M network, to communicate with one another over wired or wireless networks. An M2M node may include a sensor, meter, or other device that captures an "event" (temperature, inventory level, etc.), which is relayed through a network (wireless, wired, or hybrid) to an application that translates the captured event into meaningful information (e.g., items need to be restocked).

An M2M network may include a relatively large number of nodes that share information and potentially make collaborative decisions without direct human interaction. As the number of nodes in an M2M network increases, complexity with respect to the interaction among the nodes and the interaction of the nodes with a backend system (e.g., an application server) that collects data generated by the nodes, may also increase. The increased complexity may lead to inefficient power usage at the nodes and/or to inefficient communication patterns when uploading data sent by the nodes to the backend system.

DETAILED DESCRIPTION OF PREFERRED EMBODIMENTS

The following detailed description refers to the accompanying drawings. The same reference numbers in different drawings may identify the same or similar elements.

Techniques described herein may provide for the organization and control of nodes, in an M2M network, that may provide for energy-efficiency and prioritized control of network traffic associated with the M2M network. Energy efficiency may be particularly important for M2M nodes that are powered by a limited power source, such as a battery and/or a solar energy source.

Consistent with aspects described herein, nodes in an M2M network may be formed into clusters of nodes. In each cluster, one or more nodes may be designated as hub nodes that are responsible for uploading data collected by the cluster to a relay device for the cluster and/or to an application server. Update intervals, corresponding to the time period at which nodes in a cluster transmit data to the hub node, may be designated for the M2M network on a per-cluster basis. Similarly, hub update intervals, corresponding to the time period at which a hub node in each cluster may upload the data from the cluster to a relay device or to the backend server, may be configured on a per-hub basis. In this way, different clusters within an M2M network may be assigned different communication priorities (e.g., a cluster that is assigned a longer update interval has a lower communication priority than a cluster that is assigned a shorter update interval).

Figure 1:
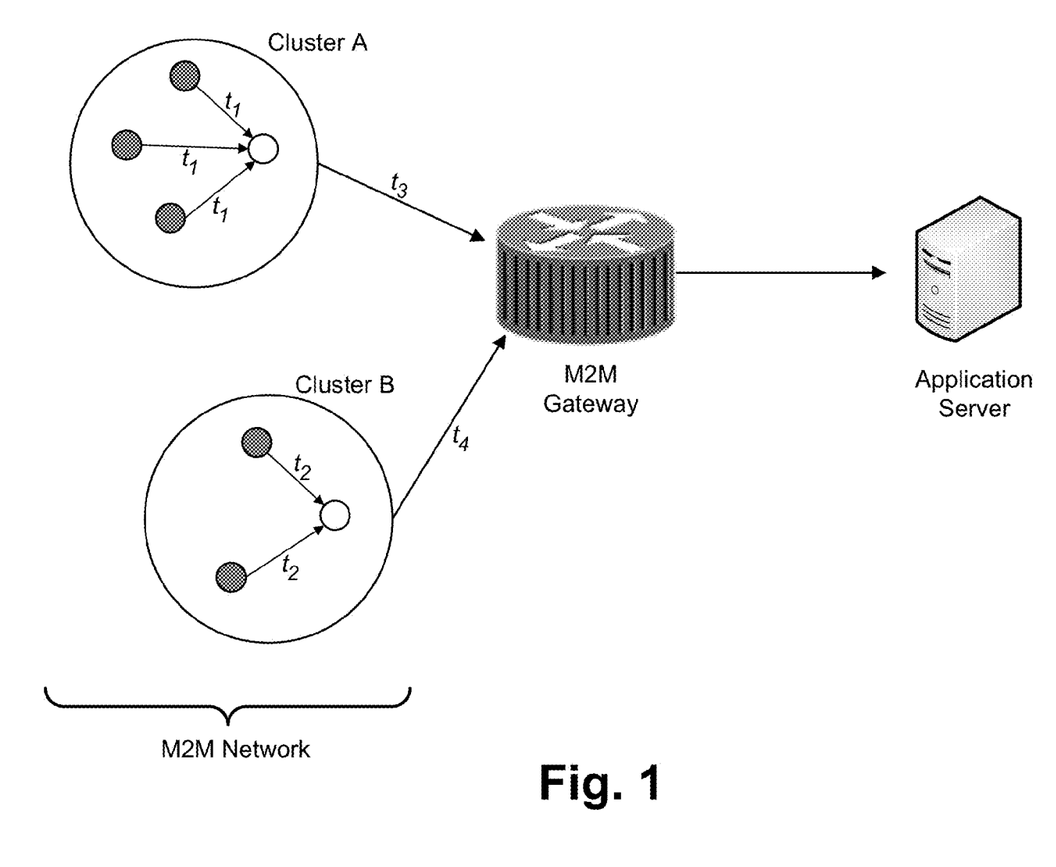
FIG. 1 is a diagram conceptually illustrating an example of an overview of concepts described herein.

FIG. 1 is a diagram conceptually illustrating an example of an overview of concepts described herein. As shown in FIG. 1, M2M nodes in an M2M network may be divided into clusters (labeled as cluster A and cluster B in FIG. 1). As illustrated, cluster A may include four nodes and cluster B may include three nodes, where each node is illustrated in FIG. 1 as a circle. Each of the nodes may be, or include, a device that includes sensing and communication functionality. For example, in the context of a M2M network used to track the location of shipping containers, each node may include circuitry to obtain geographic positioning information (e.g., GPS circuitry) and circuitry to wirelessly transmit the geographic positioning information. One or more of the nodes in each to the clusters may be designated as a "hub" node. In FIG. 1, the hub nodes are each illustrated as the node that is not shaded. The hub node in each cluster may be responsible for collecting and/or aggregating data from the other nodes in the cluster, and transmitting the data towards an application server.

As further shown in FIG. 1, an M2M gateway may act as an intermediate device between the clusters and the application server. In this example, the application server may act as the backend system through which users of the M2M network can view and act on the data that is collected by the M2M network.

Each node in a cluster may communicate data, that is sensed and/or monitored by the node, at a certain update interval. The update interval may be determined on a per-cluster basis. As illustrated, each node in cluster A may communicate the data corresponding to the node at an update interval $t_1$ (e.g., every $t_1$ seconds). Similarly, each node in cluster B may communicate the data corresponding to the node at an interval $t_2$. The intervals $t_1$ and $t_2$ may be selected to maximize energy efficiency and/or to maximize communication efficiency. For example, the data that is monitored by the nodes in cluster A may change relatively quickly (e.g., on the order of seconds). Accordingly, the interval $t_1$ may be set at a value that allows for effective sampling of the sensed data (e.g., the interval $t_1$ may be set at a few seconds). In contrast, the data that is monitored by the nodes in cluster B may change more slowly (e.g., on the order of hours) and/or the application that uses the data may not need to be updated as frequently. Accordingly, the interval $t_2$ may be longer than the interval $t_1$.

The communication of data between a node and its corresponding hub node may be a relatively energy-intensive task. By providing for the assignment of different update intervals (e.g., $t_1$, $t_2$, etc.) on a per-cluster basis, update intervals may be chosen in a way that can optimize energy efficiency of a cluster while still providing acceptable data collection rates.

The hub nodes in cluster A and cluster B may relay the collected data, corresponding to the nodes in a cluster, to the M2M gateway. In some implementations, the update intervals may be assigned on a per-cluster basis. The hub node update intervals are labeled as $t_3$ and $t_4$ in FIG. 1. By assigning different update intervals to different hub nodes, prioritization with respect to the transmission of data, associated with a cluster, may be achieved. This may be particularly useful for large M2M networks and/or M2M domains of multiple M2M networks, in which the volume of the monitored data can potentially be large. By controlling the update intervals, associated with the hub node of each cluster, network load, such as load at the M2M gateway, may be controlled. Additionally, controlling the update intervals, associated with the hub node of each cluster, may be used to optimize the energy efficiency of the hub node in each cluster.

Figure 2:
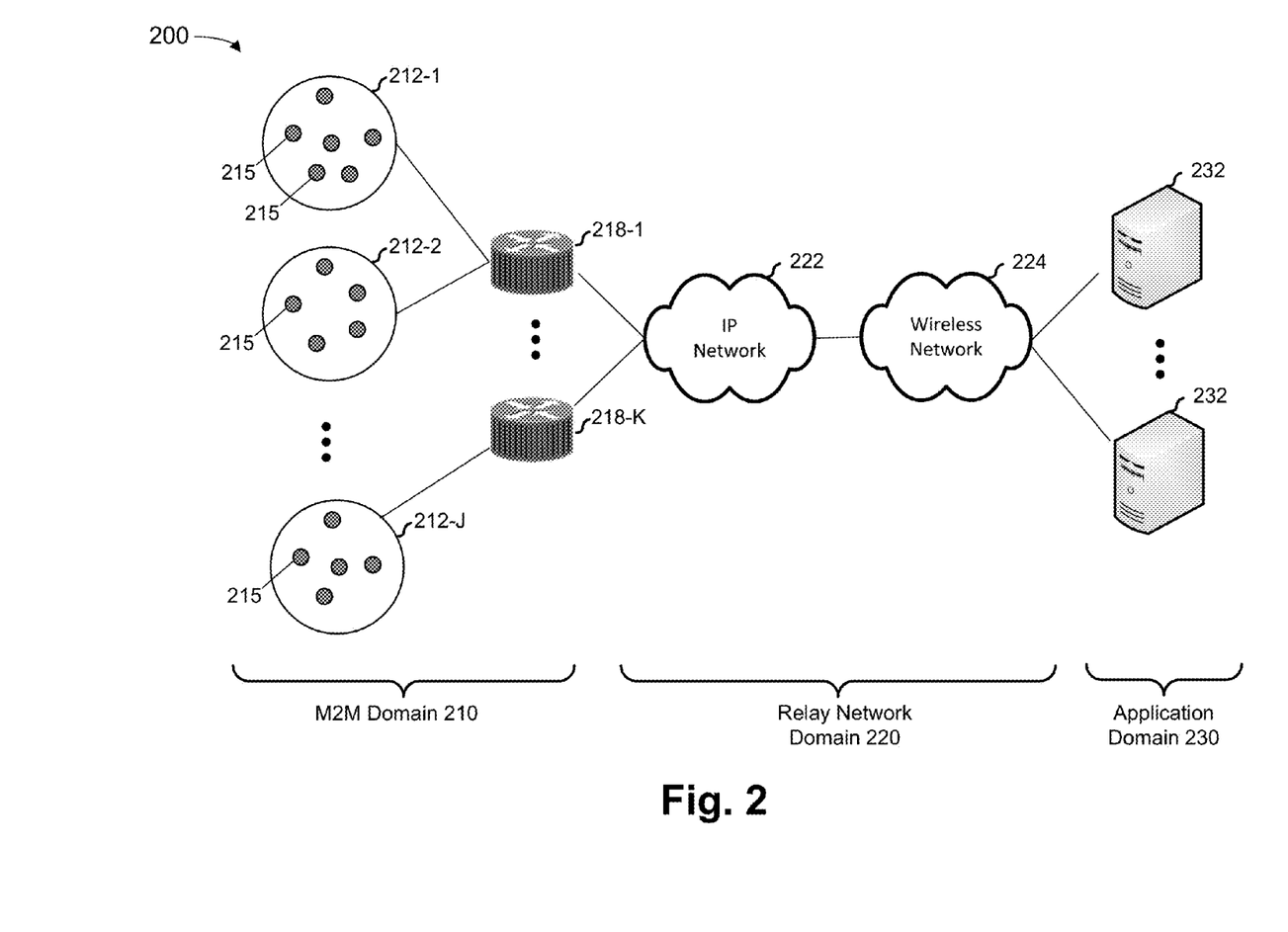
FIG. 2 is a diagram of an example environment in which systems and/or methods described herein may be implemented.

FIG. 2 is a diagram of an example environment 200 in which systems and/or methods described herein may be implemented. Environment 200 may correspond to an environment in which one or more M2M networks, which may also be referred to as M2M systems, are implemented. An M2M system/network may be defined as a number of node devices that transmit data to one or more computing devices, called an application server herein, that may be used to analyze, aggregate, and/or perform actions based on the data provided by the node devices. As illustrated, environment 200 may include M2M domain 210, relay network domain 220, and application domain 230.

M2M domain 210 may include a number of M2M networks 212-1 through 212-J, where each M2M network 212 may include one or more M2M nodes 215 (illustrated as circles in FIG. 2). Each node 215 may include a device that may implement one or more sensing components and a communication component. The sensing component may include, for example, one or more of a temperature sensor, a humidity sensor, a light sensor, a camera, a video camera, a geo-positioning element (e.g., a GPS component), or other sensors that generate or monitor data that relates to the environment of a particular node 215. The communication component may include a wireless or wired communication circuit that allows node 215 to transmit monitored data to another node or to relay network domain 220. For example, the communication component may include a cellular radio, a short range radio, circuitry to communicate over a wired link, or another communication technology.

As one example of an implementation of environment 200, M2M network 212-1 may correspond to an agriculture-based M2M network that monitors fruits, M2M network 212-2 may correspond to an agriculture-based M2M network that monitors grains, and M2M network 212-N may correspond to healthcare-base M2M network.

Nodes 215 are frequently implemented as relatively small and portable electronic devices, and may be powered based on battery power and/or solar power. For example, for an agricultural M2M network, numerous nodes 215 may be arranged in agricultural land (e.g., a vegetable field, grain field, orchard, etc.) to provide information relevant to a farmer (e.g., soil moisture readings, temperature readings, etc.). Each node 215 in such a network may be a relatively small and inexpensive device and may be powered by a battery designed to last through a single growing season.

M2M domain 210, as illustrated, may include one or more M2M gateways 218-1 through 218-K. Each M2M gateway 218 may act to receive data from one or more M2M networks 212 and forward the data towards the application domain 230 (e.g., through relay network domain 220). An M2M gateway 218 may include, for example, a router, server, or other computing device. Each M2M gateway 218 may receive data from one or more M2M networks 212 and forward the data to relay network domain 220, for eventual delivery to application domain 230. In some implementations, M2M gateway 218 may aggregate received data before forwarding the data to relay network domain 220.

Relay network domain 220 may include one or more networks that act to connect M2M domain 210 to application domain 230. The networks may include, for example, one or more networks of any type, such as a local area network (LAN), a WAN, metropolitan area network (MAN), and/or another type of network. In some implementations, the networks may include packet-based IP networks. As particularly illustrated, in the example of FIG. 2, relay network domain 220 may include an IP network 222 and a wireless network 224. In one implementation, IP network 222 may include a wired network and wireless network 224 may include a cellular network, such as a long term evolution (LTE) based wireless network. In an alternative possible implementation, IP network 222 may be omitted, and M2M gateway 218 may communicate directly with wireless network 224.

Application domain 230 may include one or more devices or applications that receive and process the data from M2M domain 210. For example, application domain 230 may include one or more application servers 232 designed to receive data from M2M domain 210, process and/or aggregate the data, and present the data, via a graphical user interface, to one or more users associated with M2M networks 212. In some implementations, based on the received data, application servers 232 may automatically control one or more other devices, such as devices associated with a manufacturing process or agricultural process. Alternatively or additionally, application servers 232 may provide analytic services through which users of application server 232 may monitor and/or evaluate M2M networks 212. In one implementation, each application server 232 may correspond to an M2M network 212. Thus, for example, users of a particular agricultural-based M2M network may interact with a first application server 232, users of a particular healthcare-based M2M network may interact with a second application server 232, etc.

Although FIG. 2 illustrates example components of an environment 200, in other implementations, environment 200 may contain fewer components, different components, differently arranged components, or additional components than those depicted in FIG. 2. Alternatively, or additionally, one or more components of environment 200 may perform one or more other tasks described as being performed by one or more other components of environment 200.

Figure 3A:
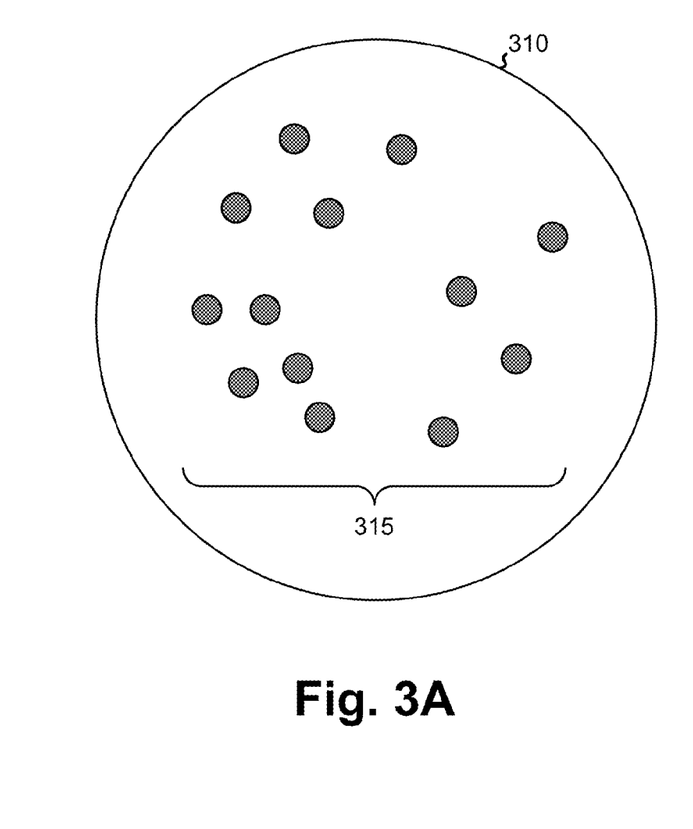
FIGS. 3A and 3B are diagrams illustrating an example of the clustering of nodes in a M2M system.
Figure 3B:
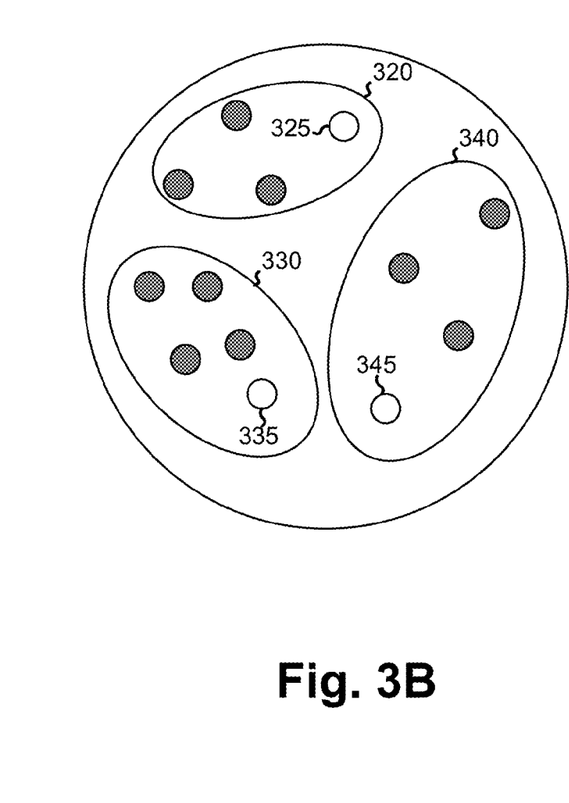

FIGS. 3A and 3B are diagrams illustrating an example of the clustering of nodes in a M2M network, such as one of M2M networks 212. As illustrated in FIG. 3A, an M2M network 310 may include a number of nodes 315 (each illustrated as a shaded circle). In some implementations, nodes 315 may be associated with a particular location, such as a particular building or field. In other implementations, nodes 315 may be geographically distributed (e.g., spread throughout a city, a state, or a country).

Consistent with aspects described herein, nodes 315 may be associated with clusters, where each cluster may be defined based on one or more factors used to define a community of interest with respect to the nodes in a cluster. In general, the nodes in M2M network 310 may be clustered into N clusters, $C_1, C_2, \ldots C_N$. In FIG. 3B, three clusters (N=3) are illustrated: cluster 320 (including four nodes), cluster 330 (including five nodes), and cluster 340 (including four nodes). In one implementation, the clusters may be manually defined, such as by users or administrators associated with an application server 232 or with relay network domain 220. In other implementations, the clusters may be automatically defined, based on one or more factors, such as based on geographical proximity of nodes 315, sensing functionality of nodes 315, or the ability of nodes 315 to communicate with one another. For example, nodes 315 may be automatically clustered based on a rule that every node in a particular cluster must be at least within a threshold distance of another node in the cluster. As another example, notes 315 may be automatically clustered based on a rule that every node in a particular cluster must be able to communicate with at least two other nodes in the cluster using a wireless connection that is associated with a minimum connection quality measurement.

As is also shown in FIG. 3B, each cluster 320, 330, and 340 may be associated with one or more hub nodes (illustrated as a circle without shading in FIG. 3B). In particular, as shown in FIG. 3B, cluster 320 may be associated with hub node 325, cluster 330 may be associated with hub node 335, and cluster 340 may be associated with hub node 345. Each hub node 325, 335, and 345 may be responsible for receiving data that is sensed and transmitted by the other nodes in the corresponding cluster.

In some implementations, each non-hub node in a cluster may directly transmit the data, sensed or monitored by the non-hub node, to a hub node of the cluster (e.g., via a short range wireless protocol, such as protocols based on the IEEE 802.15.4 standard). In other implementations, nodes in a cluster may dynamically arrange themselves into a peer-to-peer local network, in which data sensed by a particular non-hub node may be forwarded through the peer-to-peer network to the hub node.

Figure 4:
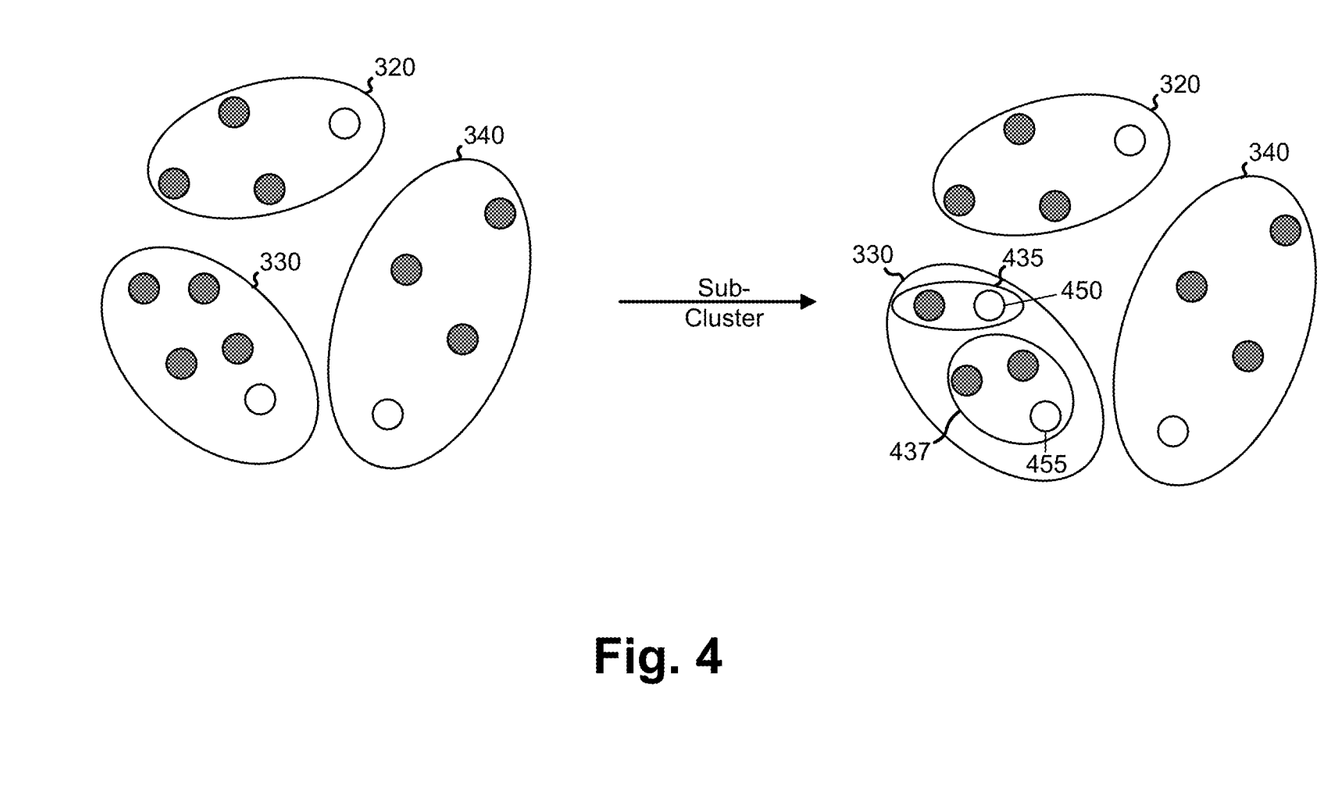
FIG. 4 is a diagram illustrating an example of sub-clusters of a cluster.

In some implementations, clustering may be hierarchically performed to generate sub-clusters of a cluster. FIG. 4 is a diagram illustrating an example of sub-clusters of a cluster. In particular, as shown in FIG. 4, cluster 330 (including five nodes) is further divided into sub-clusters 435 (including two nodes) and 437 (including three nodes). In each sub-cluster, one or more of the nodes in the sub-cluster may be designated as a hub node, with respect to the sub-cluster. The hub node of a sub-cluster may forward data, received from other nodes of the sub-cluster, to a hub node that that is designated for the corresponding cluster. For example, for the cluster shown in FIG. 4, assume that node 450 is designated as the hub node for sub-cluster 435 and node 455 is designated as the hub node for sub-cluster 437. In this example, assume that node 450 is also designated as the hub node for cluster 330. Accordingly, hub node 455 may transmit data (e.g., data received from other nodes in sub-cluster 437, as well as data collected by node 455) to hub node 450. In other implementations, other techniques can be used for transmitting data from the sub-clusters. For example, the hub node of each sub-cluster may directly transmit data, associated with the sub-cluster, to M2M gateway 218. As another example, a separate hub node, not associated with any of the sub-clusters, may act as a hub node for all of the sub-clusters of a particular cluster.

Real-world M2M domains 210 and/or M2M networks 212 may include a large number of nodes that may send data to the corresponding M2M gateways 218. This can be potentially problematic as a large number of nodes that constantly monitor data may consume a large amount of power and a large number of nodes that continuously transmit data to corresponding M2M gateways 218 may consume network resources that may potentially over load M2M gateways 218. Consistent with aspects described herein, and as described in more detail below, by applying clustering to M2M networks, and assigning hub nodes to clusters, such as the clustering described with respect to FIGS. 3 and 4, power usage and network resources, corresponding to M2M networks, may be controlled and/or optimized by a network operator or an operator of an application server 232.

Figure 5:
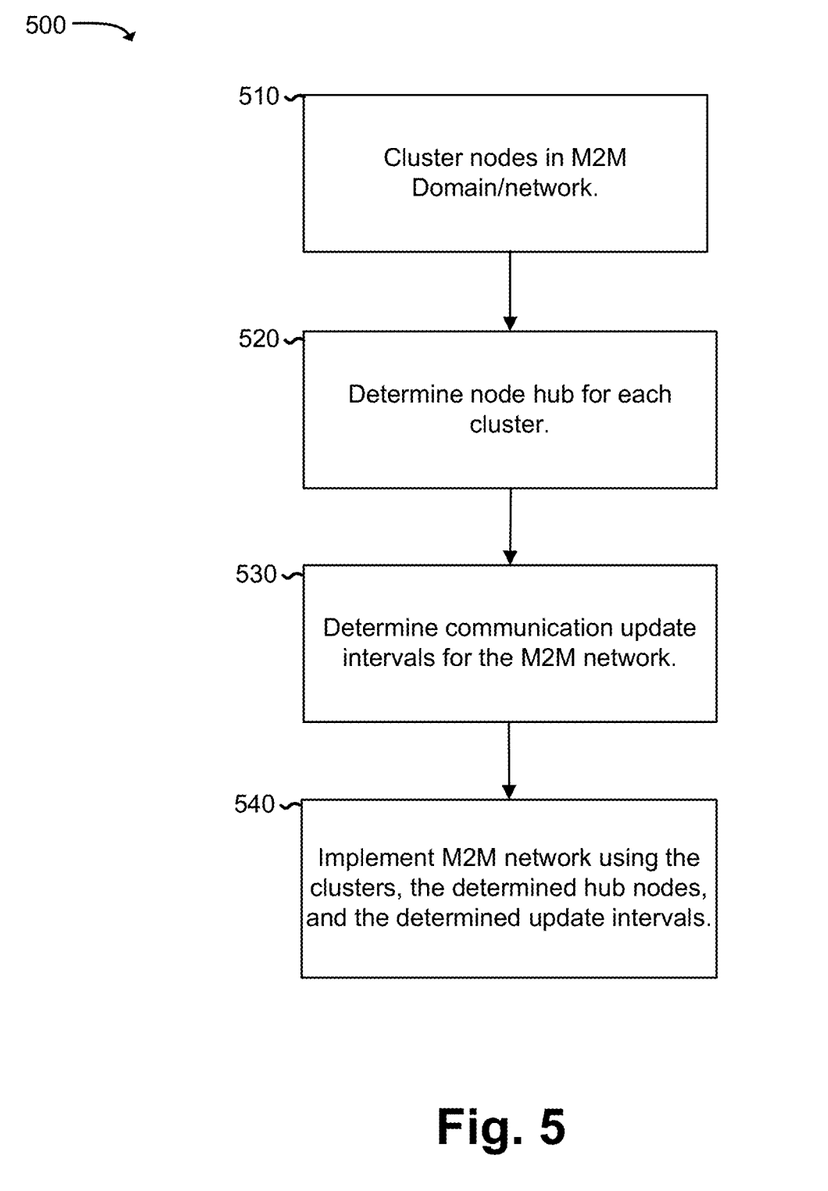
FIG. 5 is a flow chart illustrating an example process for implementing an M2M system.

FIG. 5 is a flow chart illustrating an example process 500 for implementing an M2M network. Process 500 may be performed, for example, by application server 232 and/or by another computing device or devices.

Process 500 may include clustering M2M nodes in an M2M domain or network (block 510). For example, the nodes in M2M network 310 may be clustered into two or more clusters or sub-clusters. As previously mentioned, in some implementations, the clustering may be performed pursuant to a manual definition of which node should be in which clusters. In other implementations, the clustering may be performed automatically based on the community of interest associated with the nodes. The community of interest for a cluster may be based on factors such as geographical proximity of nodes, sensing functionality of nodes, the ability of nodes to communicate with one another, and/or other factors.

In some implementations, cluster definitions may be transmitted from application server 232 (or relay network domain 220) to the nodes in M2M domain 210. In this situation, the cluster definitions for M2M network 310 may be dynamically reconfigurable. In other implementations, cluster definitions may be defined during the design or implementation of M2M domain 210 without the ability to later reconfigure clusters.

Process 500 may further include determining a hub node for each cluster (block 520). As previously mentioned, the hub node, for a particular cluster, may function as the communication point for the particular cluster. Other nodes in the particular cluster may forward, either directly or indirectly, data to the hub node. In some implementations, the hub node may be determined automatically for a cluster. For example, a centrally located node may be designated as a hub node for a cluster or a node with the highest quality connection to M2M gateway 218 may be designated as the hub node for the cluster. As another example, in some M2M implementations, different nodes in a cluster may have different capabilities. In this case, the capabilities of the different nodes may be taken into account when determining a hub node (e.g., only certain nodes may have a radio interface capable of communicating with M2M gateway 218). In other implementations, the hub node for a cluster may be designated manually by an administrator or other user of application server 232.

In some implementations, an indication of the hub node for each cluster may be transmitted from application server 232 to the nodes in M2M network 310. In this situation, the hub nodes for M2M network 310 may be dynamically reconfigurable. In other implementations, the hub nodes may be specified during the design or implementation of M2M network 310.

Process 500 may further include determining communication update intervals for the M2M network (block 530). As previously mentioned, each non-hub node in a cluster (or sub-cluster) may transmit data (such as data sensed or received by the node) to the corresponding hub node based on an update interval specified for the cluster. The update interval may be identical for all nodes in a particular cluster. In other words, the update interval may specify how often nodes in the cluster send monitoring/sensed data to the corresponding hub node. The update interval may also serve as a priority control mechanism for data in the M2M network, as nodes with a longer update interval may be less active in the M2M network.

A node, after sending data pursuant to its update interval, may enter a low-power mode (e.g., a "sleep" mode). After a time period corresponding to the next update interval, the node may exit the low-power mode and transmit the data to the corresponding hub node. By entering the low-power mode between data updates, the node may operate in an energy efficient manner. In some implementations, the node may obtain data associated with the node (e.g., using one or more sensors) at each update interval. Alternatively or additionally, the node may obtain the data in a manner not tied to the update interval (e.g., the node may continuously collect data in a low power sensing state).

As one example of the technique for determining update intervals for clusters in a M2M network, consider N clusters, $C_i$ (i has the integer values one to N) in an M2M network. Each M2M node may transmit a real-time update message, to the corresponding hub, each update interval, $T_1$. After sending an update, an M2M node may be in low-power mode until the next update interval. For this example, if the time period $T_1$ was set at 1000 seconds, each M2M node in cluster $C_i$ may send the data to its hub at time 0, 1000, 2000, 3000, etc. Alternatively, different M2M nodes in cluster $C_i$ may exit low-power modes at different times, but still exit the low power mode according to the update interval $T_1$. This may be beneficial, for example, when the communication channel within a cluster has a limited capacity such that the communication channel cannot handle simultaneous transmission from all the nodes in cluster $C_i$.

As previously mentioned, varying the update interval, T, between different clusters may be useful for scheduling of traffic for a particular M2M network, as the ability to modify the update interval between clusters can allow for priority control between different clusters. By specifying shorter time periods for the update interval, higher priority can be given to the cluster, as the nodes in that cluster may transmit data more frequently. By controlling the update interval, quality of service (QoS) among clusters may thus be provided. In some implementations, the update interval T may be controlled by application server 232. In other implementations, a network service provider, such as a provider of relay network domain 220, may control the update interval.

In one implementation, the update interval may be calculated for each cluster in the following manner:

$$T_i = \frac{T}{\phi_i}, \text{ for each } C_i$$

Here, T is the baseline time period specified for the M2M domain, and $\varnothing_L$ is a weight given to each cluster, where $\Sigma_{i=1}^{N}\varnothing_i=1$ and $0<\varnothing_i\leq 1$. By giving more weight (higher $\varnothing_i$ value), more priority can be given to a cluster, by specifying a shorter time period.

As an example of the application of the equation given above, assume that T=100 seconds, and $\varnothing_1$=0.5 (for cluster 1), $\varnothing_2$=0.4 (for cluster 2), and $\varnothing_3$=0.1 (for cluster 3). In this situation, the nodes in cluster 1 may send monitoring data to the corresponding hub node every 200 seconds; the nodes in cluster 2 may send monitoring data to the corresponding hub node every 250 seconds; and the nodes in cluster 3 may send monitoring data to the corresponding hub node in cluster 3 every 1000 seconds. In this example, the highest priority is given to cluster 1, and the lowest priority is given to cluster 3. By controlling the weights of (I), differentiated services or QoS can be provided to M2M communications on a cluster level.

For M2M networks in which it is not desired to give priority to any specific cluster, the weights, φ, may be set to 1; that is, $\varnothing_i$=1, for all i. This may cause all nodes in each cluster to send messages at the same update interval.

In block 530, in addition to determining the update intervals for non-hub nodes in the clusters in an M2M domain, the update intervals for the hub nodes of the clusters may be determined. The update interval for a hub node may correspond to the interval at which application server 232 receives data for the cluster from the hub node. Varying the update interval, for hub nodes associated with different clusters, may be useful for scheduling of traffic to M2M gateway 218. In particular, the ability to modify the update interval for different clusters can allow for priority control of data transmitted by the hub nodes corresponding to the clusters.

As one example for determining update intervals for hub nodes in a M2M domain, assume that the update interval, τ, for each cluster is specified in the following manner:

$$t_j = \frac{\tau}{\theta_j}, \text{ for each hub,}$$

where τ is a baseline update interval for hubs in the M2M domain, and $\theta_j$ is the weight given to each cluster, where $\Sigma_{j=1}^{N}\theta^j=1$ and $0<\theta_j\leq 1$. By giving more weight (higher $\theta_j$ value), shorter update intervals will be calculated, resulting in a higher priority being given to the cluster. In some implementations, T may be set equal for all hub nodes, resulting in equal priority being given to each cluster.

Referring back to FIG. 5, process 500 may further include implementing the M2M domain based on the determined clusters, the determined hub nodes, and the determined update intervals (block 540). In some implementations, nodes in M2M network may be dynamically configured or reconfigured to support the determined clusters, hub nodes, and communication time intervals. For example, application server 232 or a network provider associated with relay network domain 220 (e.g., a network service provider) may transmit messages to one or more nodes in an M2M network. These messages may instruct the nodes to implement the determined clusters, hub nodes, and/or update intervals. Alternatively, or additionally, when initially setting up an M2M network, the M2M network may be configured based on the determined clusters, hub nodes, and update intervals.

Figure 6:
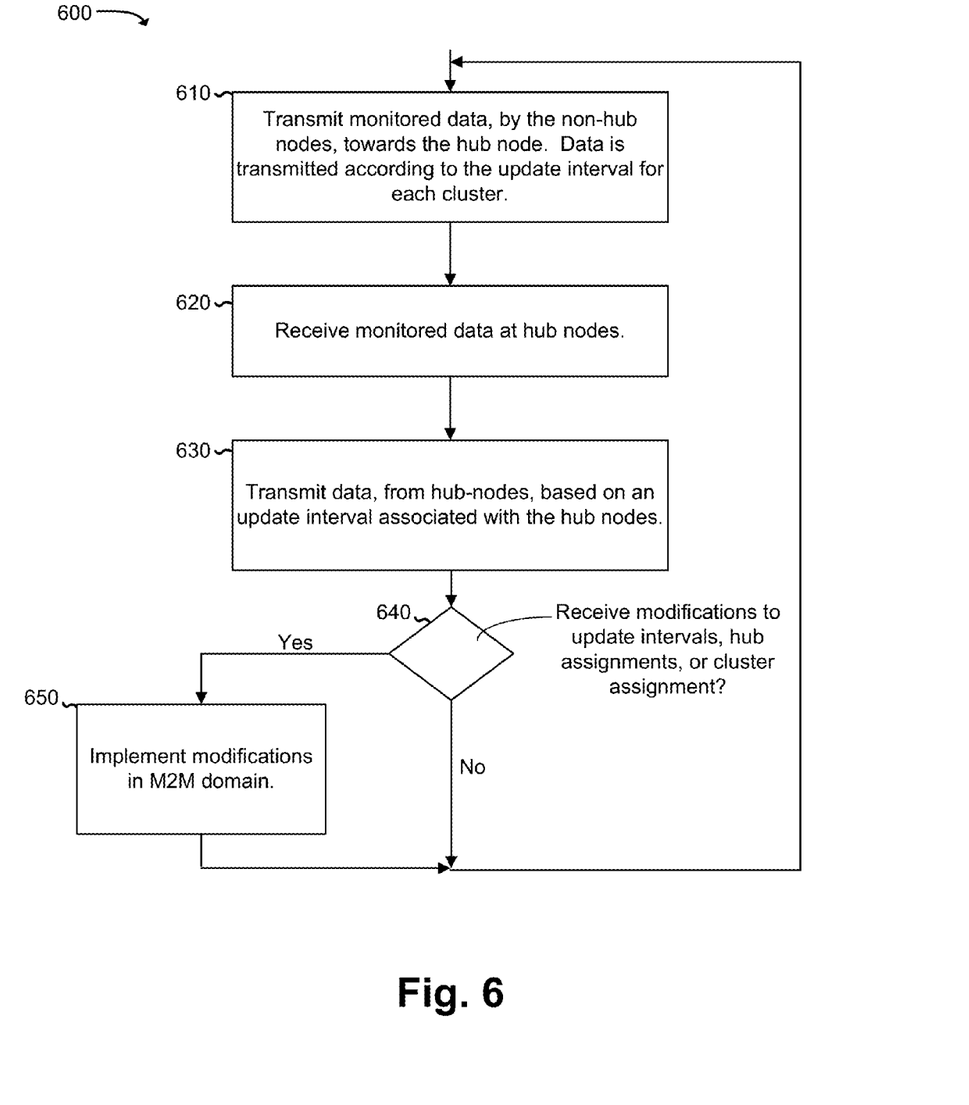
FIG. 6 is a flow chart illustrating an example process relating to the operation of an M2M domain.

FIG. 6 is a flow chart illustrating an example process 600 relating to the operation of an M2M network. Process 600 may be performed, for example, by some or all of the nodes in the M2M network.

Process 600 may include transmitting the monitored data, by the non-hub nodes in a cluster, towards the hub node for the cluster (block 610). The data may be transmitted, by the non-hub nodes, according to the update interval that is set for the cluster (block 610). For example, as mentioned above, the update interval $T_1$, may be determined for each cluster $C_i$. The update interval may be used by each node in the cluster to determine the period at which the node transmits a message, containing the monitored or sensed data that is obtained by the node, to the hub node for the cluster.

Messages containing the monitored data may be transmitted directly to the hub node for a cluster or may be propagated through the non-hub nodes of the cluster and towards the hub node. Process 600 may include receiving, at the hub nodes, the monitored data (block 620). In some implementations, the hub nodes may themselves monitor and/or sense data.

Process 600 may further include transmitting, by the hub nodes, the data received from the non-hub nodes (block 630). The hub nodes may transmit data based on update intervals associated with the hub nodes. The data may be forwarded to M2M gateway 218, for eventual delivery to application server 232. In some implementations, a hub node may aggregate the data from a number of non-hub nodes before forwarding the aggregated data to M2M gateway 218. In other implementations, the hub node may process and/or analyze the data from the non-hub nodes. For example, a hub node may average a number of values received from a corresponding number of non-hub nodes, and forward the averaged value to M2M gateway 218. M2M gateway 218 may similarly aggregate and/or process the received data, potentially from a number of clusters, before forwarding the data (or a processed version of the data) to application server 232.

Occasionally, it may be desirable to change the parameters relating to the operation of the nodes in an M2M network. Process 600 may further include receiving modifications to the update intervals, the hub assignments, or the clustering assignments (block 640). For example, application server 232 or an entity in relay network domain 220 may determine that a modification to the update intervals, hub assignments, or the clustering assignments is desirable. Application server 232 or an entity in relay network domain 220 may transmit one or more messages to the relevant clusters, such as to the hub node of the affected cluster(s). The hub node may then act on the message (e.g., if the modification was to change the update interval of the hub node) forward the message to the affected non-hub nodes (e.g., if the modification was to change the update interval of the non-hub nodes). In this manner, modifications may be implemented in the M2M network (block 640—YES, and block 650).

Figure 7:
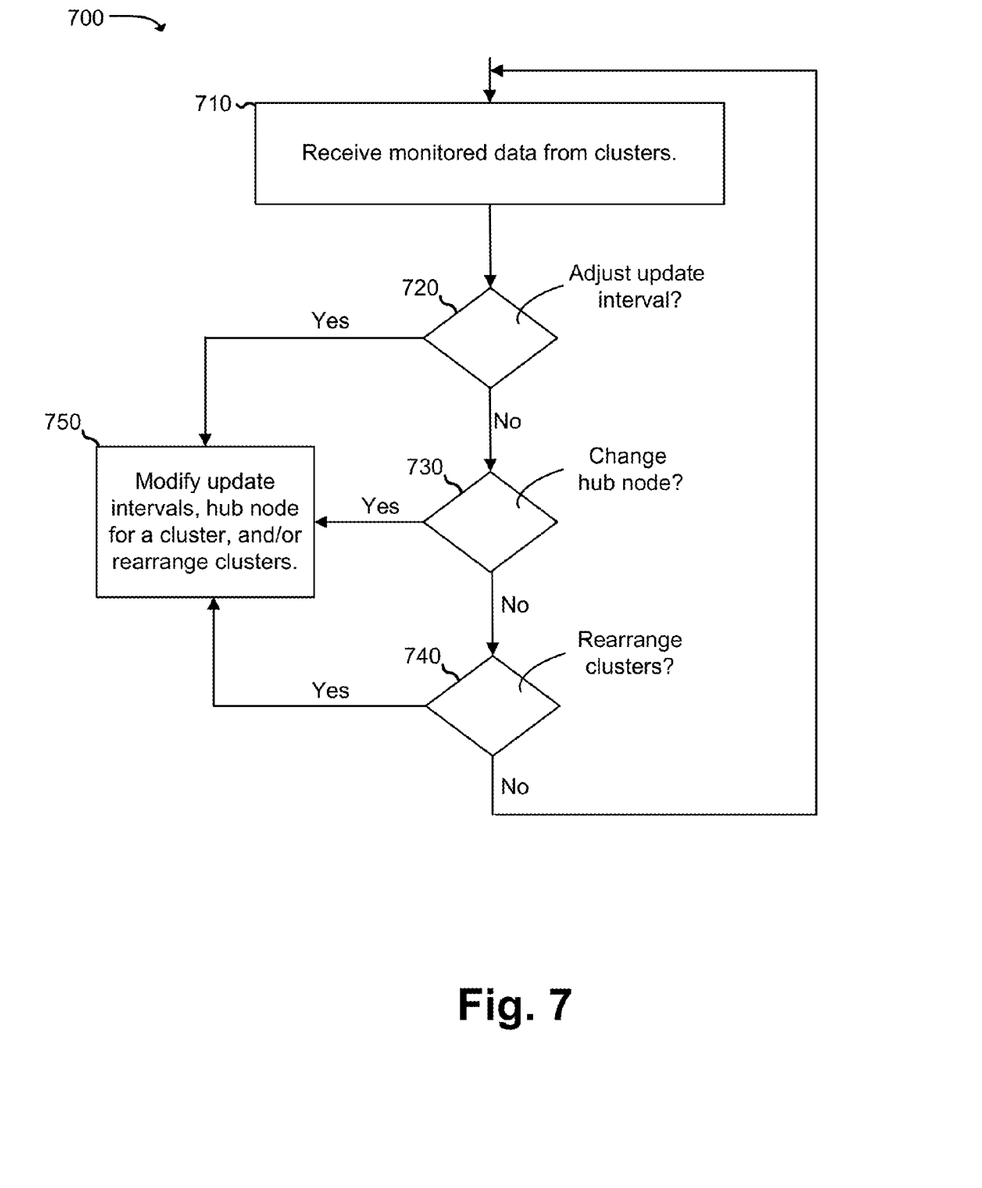
FIG. 7 is a flow chart illustrating an example process relating to the control of an M2M domain.

FIG. 7 is a flow chart illustrating an example process 700 relating to the control of an M2M network. Process 700 may be performed, for example, by application server 232 and/or by devices in relay network domain 220.

Process 700 may include receiving monitored data from the clusters (block 710). For example, application server 232 may receive update messages, that were transmitted by hub nodes, through M2M gateways 218. The update messages may be received at a respective frequency corresponding to the update interval of each of the hubs. Application server 232 may aggregate and/or analyze the data corresponding to the received update messages, such as by presenting the data to a user.

Process 700 may further include determining whether to adjust the update intervals (block 720). At certain times, it may be desirable to adjust the update intervals corresponding to the hub nodes and/or the non-hub nodes. For example, an administrator of M2M domain 210 or an operator of relay network domain 220 may determine that a first one of the clusters should be given a higher priority relative to a second one of clusters. The update interval of the hub node of the first one of clusters may thus be decreased. As another example, an administrator of M2M domain 210 or an operator of relay network domain 220 may determine that the monitored data from a particular cluster does not need to be received as frequently as it is currently being received. As another example, application server 232 may determine, based on automatic analysis of received data, that monitored data from a particular cluster has a low frequency of change (e.g., it varies relatively little between updates) and does not need to be received as frequently as it is currently being received. Accordingly, the update interval of the hubs in the particular cluster may be increased, potentially increasing the power efficiency of the cluster.

Process 700 may further include determining whether to change the hub node for a cluster (block 730). For example, an administrator of M2M domain 210 or an operator of relay network domain 220 may determine that a different node within a cluster would be able to more optimally function as the hub node of the cluster. As another example, the current hub node for a cluster may fail or begin to experience performance issues (e.g., low battery). The administrator, or application server 232, may thus change the hub node for a particular cluster.

Process 700 may further include determining whether to rearrange the clustering for an M2M network (block 740). An administrator of M2M domain 210 or an operator of relay network domain 220 may determine that a different cluster arrangement is desirable. As another example, application server 232, based on an automated analysis, may determine that a different cluster arrangement is desirable. As an example, nodes may be used on vehicles or other mobile structures. The nodes in the clusters may thus be periodically rearranged based on the current location of the vehicles.

In response to the determination to adjust the update intervals (block 720—YES), change the hub node for a cluster (block 730—YES), or rearrange the clusters (block 740—YES), process 700 may include modifying the update intervals, changing the hub node for a cluster, or rearranging the clusters, respectively (block 750). For example, a message may be sent, such as from application server 232, to the hub nodes of the affected clusters. The message may indicate instruct the hub nodes to implement the desired changes.

Figure 8:
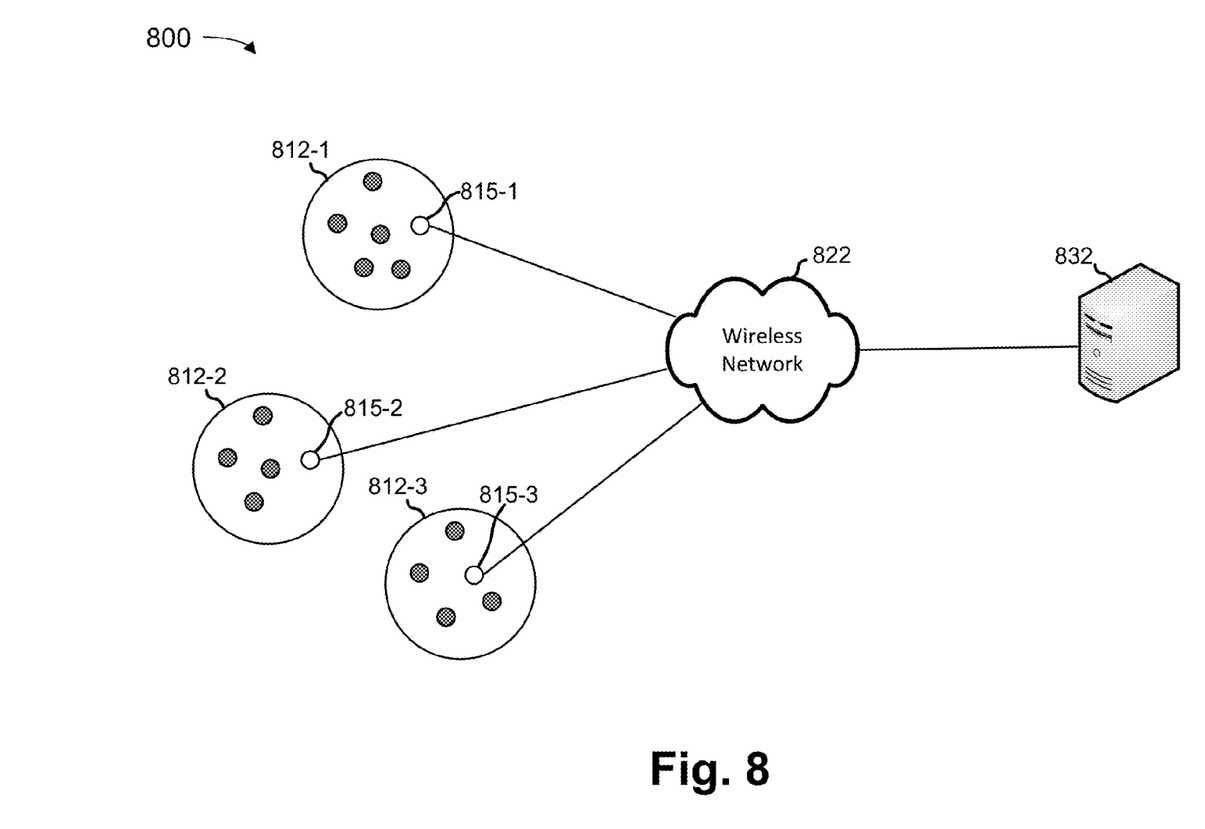
FIG. 8 is a diagram of an alternative example environment in which systems and/or methods, relating to M2M systems, may be implemented.

FIG. 8 is a diagram of an alternative example environment 800 in which systems and/or methods, relating to M2M networks, may be implemented. Environment 800 may represent a more specific case of environment 200. As illustrated, clusters 812-1, 812-2, and 812-3 may each include a number of nodes, including hub nodes 815-1, 815-2, and 815-3 (referred to collectively as hub nodes 815 or singularly as a hub node 815), respectively. Each of hub nodes 815 may directly communicate, through wireless network 822, with application server 832. Relative to environment 200 (FIG. 2), M2M relay devices 218 and IP network 222 of FIG. 2 may be omitted, and/or the functionality of these devices may be included in the hub nodes 815 and/or wireless network 822. In one implementation, wireless network 822 may include a cellular radio network and hub nodes 815 may include devices with cellular radio circuitry. Hub nodes 815 may receive monitored data, from nodes 812, and directly transmit the monitored data, to application server 832, over wireless network 822, using a cellular radio technology implemented by wireless network 822.

As discussed herein, techniques were described for implementing energy efficient M2M domains that also provide for traffic prioritization from M2M devices. Nodes in an M2M domain may be classified into clusters and different update intervals assigned to each cluster. By using clusters and a hub node associated with each cluster, M2M gateways 218 may need to interface with a relatively small number of nodes compared to all the nodes in an M2M domain 210. Because M2M gateways 218 may receive less traffic from hub nodes associated with clusters, M2M gateways 218 may have a reduced data processing burden, and may transmit smaller amount of data to an application server 232, potentially avoiding traffic congestion in relay network domain 220 and/or at application server 232. The different update intervals for the nodes in the hub nodes may be used to control energy efficiency and traffic prioritization for the various clusters.

Figure 9:
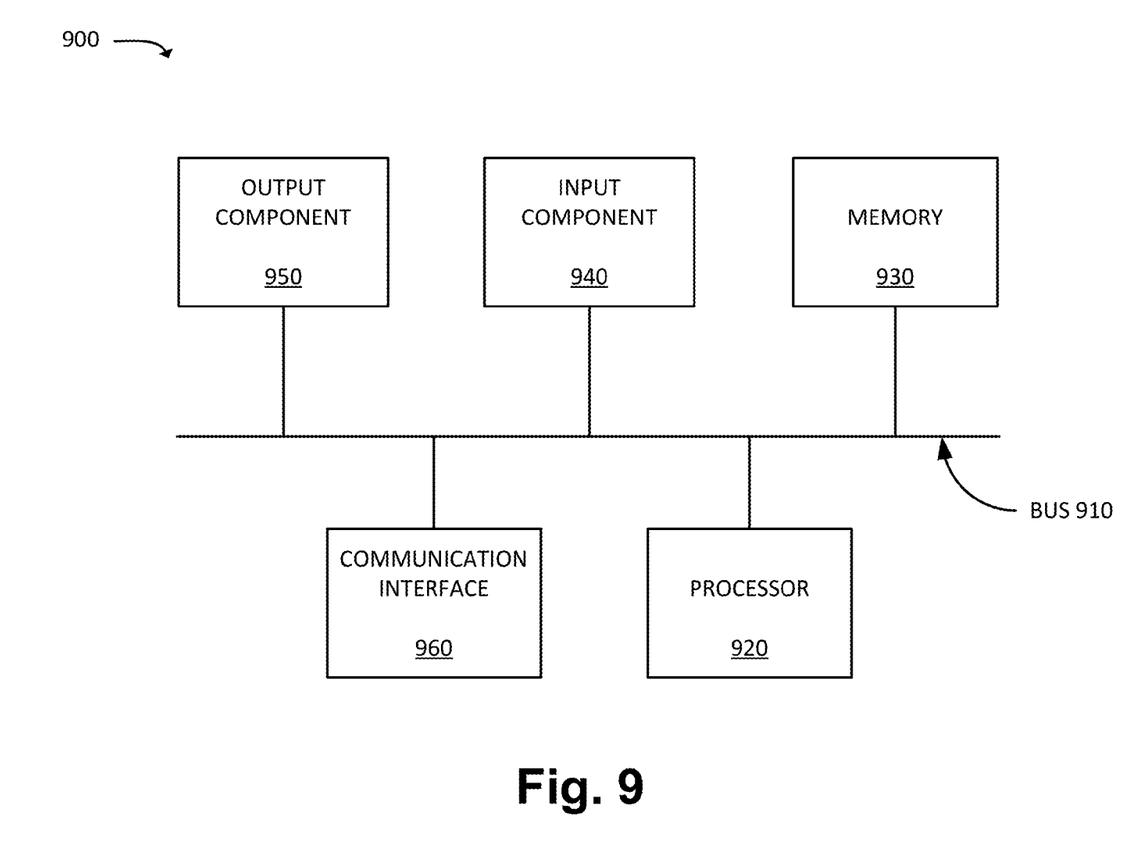
FIG. 9 is a diagram of example components of a device.

FIG. 9 is a diagram of example components of device 900. One or more of the devices illustrated in FIGS. 1-4 and 8 may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, a radio interface, or the like. Communication interface 960 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5-7, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method comprising:
    clustering, by one or more devices, a plurality of nodes in a machine to machine (M2M) network, into a plurality of clusters, each of the clusters including:
        one or more nodes to generate data relating to an environment of the M2M network, and
        a hub node to receive, from the one or more nodes, the generated data,
        the clustering of the plurality of nodes including automatically determining the plurality of clusters, by the one or more devices, based on geographic proximity of the plurality of nodes to one another;
    setting, by the one or more devices, a first update interval for the one or more nodes in each of the clusters, the first update interval for the one or more nodes being set on a per-cluster basis and defining a period at which the one or more nodes in a particular cluster transmit data towards a corresponding hub node of the particular cluster;
    setting, by the one or more devices, a second update interval for the hub node of each of the clusters, the second update interval for the hub node being set on a per-cluster basis and defining a period at which the hub node transmits data, received from the one or more nodes of the particular cluster, to the one or more devices; and
    receiving, by the one or more devices, the data transmitted by the hub nodes corresponding to each of the plurality of clusters.

2. The method of claim 1, wherein the one or more nodes that generate data enter a low-power mode in between transmitting the data towards the corresponding hub node of the particular cluster.

3. The method of claim 1, wherein clustering the plurality of nodes in the M2M network further includes:
hierarchically clustering the plurality of nodes to include one or more sub-clusters.

4. The method of claim 3, wherein each of the one or more sub-clusters includes:
at least two nodes, and
a hub node to:
receive data generated by the at least two nodes, and
output the data generated by the at least two nodes.

5. The method of claim 1, further comprising:
rearranging clustering of the plurality of nodes such that at least one node in the M2M network is assigned to a different cluster of the plurality of clusters.

6. The method of claim 1, further comprising:
modifying the first update interval, for the one or more nodes, or the second update interval, for the hub node, of the particular cluster.

7. The method of claim 1, wherein clustering the plurality of nodes in the M2M network further includes:
automatically determining the plurality of clusters based on a plurality of factors that define a community of interest for each of the plurality of clusters.

8. The method of claim 7, wherein the plurality of factors include:
the geographic proximity of the one or more nodes; and
ability of the one or more nodes to communicate with one another.

9. The method of claim 1, further comprising:
providing visualization or analysis services relating to the received data from the plurality of clusters.

10. A server device comprising processing circuitry to:
determine clusters for a plurality of nodes in a machine to machine (M2M) network, each of the clusters including:
one or more nodes to generate data relating to an environment of the M2M network, and
a hub node to receive, from the one or more nodes, the generated data,
the determination of the clusters of the plurality of nodes including automatically determining the plurality of clusters, by the server, based on geographic proximity of the plurality of nodes to one another;
set a first update interval for the one or more nodes in each of the clusters, the first update interval for the one or more nodes being set on a per-cluster basis and defining a period at which the one or more nodes in a particular cluster transmit data towards a corresponding hub node of the particular cluster;
set a second update interval for the hub node of each of the clusters, the second update interval for the hub node being set on a per-cluster basis and defining a period at which the hub node transmits data, received from the one or more nodes of the particular cluster, to the one or more devices; and
receive, by the one or more devices, the data transmitted by the hub nodes corresponding to each of the plurality of clusters.

11. The server device of claim 10, wherein the one or more nodes that generate data enter a low-power mode in between transmitting the data towards the corresponding hub node of the particular cluster.

12. The server device of claim 10, wherein, when determining the clusters of the plurality of nodes in the M2M network, the processing circuitry is further to:
hierarchically cluster the plurality of nodes to include one or more sub-clusters.

13. The server device of claim 12, wherein each of the one or more sub-clusters includes:
at least two nodes, and
a hub node to:
receive data generated by the at least two nodes, and
output the data generated by the at least two nodes.

14. The server device of claim 10, wherein the processing circuitry is further to:
rearrange clusters of the plurality of nodes such that at least one node in the M2M network is assigned to a different cluster of the plurality of clusters.

15. The server device of claim 10, wherein the processing circuitry is further to:
modifying the first update interval, for the one or more nodes, or the second update interval, the hub node, of the particular cluster.

16. The server device of claim 10, wherein, when determining the clusters of the plurality of nodes in the M2M network, the processing circuitry is further to:
automatically determine the plurality of clusters based on one or more factors that define a community of interest for each of the plurality of clusters.

17. The server device of claim 10, wherein the one or more factors include:
the geographic proximity of the one or more nodes; and
ability of the one or more nodes to communicate with one another.

18. A non-transitory computer readable medium containing program instructions for causing one or more processors to:
determine clusters for a plurality of nodes in a machine to machine (M2M) network, each of the clusters including:
one or more nodes to generate data relating to an environment of the M2M network, and
a hub node to receive, from the one or more nodes, the generated data,
the determination of the clusters of the plurality of nodes including automatically determining the plurality of clusters, by the server, based on geographic proximity of the plurality of nodes to one another;
set a first update interval for the one or more nodes in each of the clusters, the first update interval for the one or more nodes being set on a per-cluster basis and defining a period at which the one or more nodes in a particular cluster transmit data towards a corresponding hub node of the particular cluster;
set a second update interval for the hub node of each of the clusters, the second update interval for the hub node being set on a per-cluster basis and defining a period at which the hub node transmits data, received from the one or more nodes of the particular cluster, to the one or more devices; and
receive, by the one or more devices, the data transmitted by the hub nodes corresponding to each of the plurality of clusters.

19. A non-transitory computer readable medium of claim 18, wherein the one or more nodes that generate data enter a low-power mode in between transmitting the data towards the corresponding hub node of the particular cluster.

20. A non-transitory computer readable medium of claim 18, wherein clustering the plurality of nodes in the M2M network further includes hierarchically clustering the plurality of nodes to include one or more sub-clusters.

* * * * *